(12) United States Patent
Lee

(10) Patent No.: US 10,152,816 B2
(45) Date of Patent: Dec. 11, 2018

(54) TOP-VIEW IMAGE GENERATING APPARATUS AND METHOD

(71) Applicant: HYUNDAI MOBIS CO., LTD., Yongin-si, Gyeonggi-do (KR)

(72) Inventor: Seong Soo Lee, Jincheon-gun (KR)

(73) Assignee: HYUNDAI MOBIS CO., LTD., Yongin-si (KR)

( * ) Notice: Subject to any disclaimer, the term of this patent is extended or adjusted under 35 U.S.C. 154(b) by 30 days.

(21) Appl. No.: 15/629,393

(22) Filed: Jun. 21, 2017

(65) Prior Publication Data
US 2018/0053330 A1 Feb. 22, 2018

(30) Foreign Application Priority Data
Aug. 17, 2016 (KR) .................. 10-2016-0104222

(51) Int. Cl.
| | |
|---|---|
| H04N 7/18 | (2006.01) |
| H04N 5/247 | (2006.01) |
| G06T 11/60 | (2006.01) |
| G06T 7/38 | (2017.01) |
| G06T 7/70 | (2017.01) |
| B60R 1/00 | (2006.01) |
| G06K 9/00 | (2006.01) |
| H04N 5/232 | (2006.01) |
| H04N 5/262 | (2006.01) |

(52) U.S. Cl.
CPC .............. *G06T 11/60* (2013.01); *B60R 1/00* (2013.01); *G06K 9/00798* (2013.01); *G06T 7/38* (2017.01); *G06T 7/70* (2017.01); *H04N 5/23238* (2013.01); *H04N 5/247* (2013.01); *H04N 5/2628* (2013.01); *B60R 2300/105* (2013.01); *B60R 2300/303* (2013.01); *B60R 2300/607* (2013.01); *B60R 2300/804* (2013.01)

(58) Field of Classification Search
CPC .......... H04N 7/18; H04N 7/181; H04N 7/185; H04N 5/23238; H04N 5/247; H04N 5/2628; H04N 5/232; H04N 5/262; G06T 11/60; G06T 7/38; G06T 7/70; B60R 1/00; B60R 2300/105; B60R 2300/303; B60R 2300/607; B60R 2300/804; G06K 9/00798
USPC ....... 348/148, 135, 139, 142, 143, 169, 159; 701/301; 382/103, 104
See application file for complete search history.

(56) References Cited

U.S. PATENT DOCUMENTS

2016/0314360 A1\* 10/2016 Kizumi .............. G06K 9/00798

\* cited by examiner

*Primary Examiner* — Sherrie Hsia
(74) *Attorney, Agent, or Firm* — Knobbe Martens Olson & Bear LLP

(57) ABSTRACT

Provided is a top-view image generating method. The top-view image generating method estimates a posture angle of a camera providing at least one image, based on a ground feature point detected from the at least one image of front, rear, left, and right images and estimates a posture angle of a camera providing the other image from which the ground feature point is not detected. Subsequently, based on the estimated posture angles, the front, rear, left, and right images are rotation-converted, and then, a top-view image is generated by synthesizing images obtained through the rotation-conversion.

13 Claims, 16 Drawing Sheets

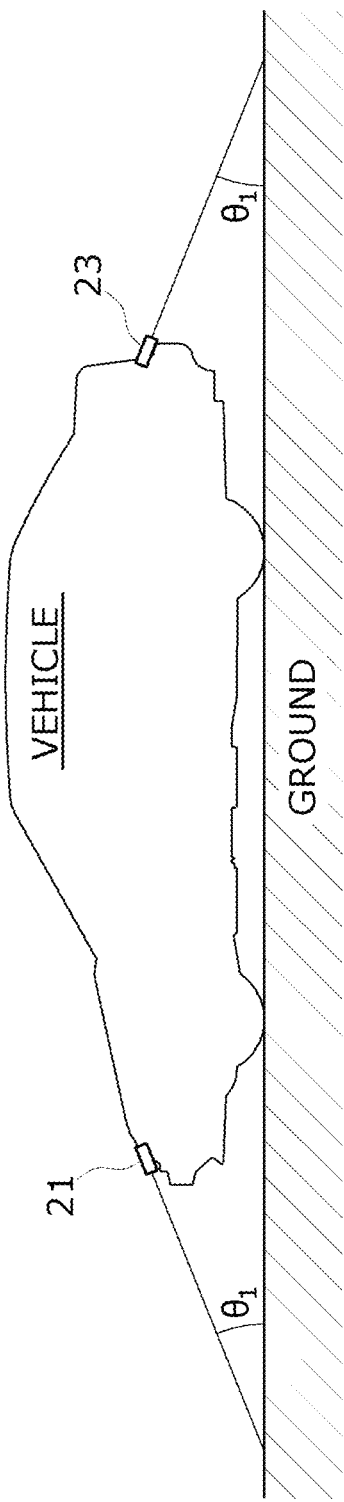

(A)  (B)

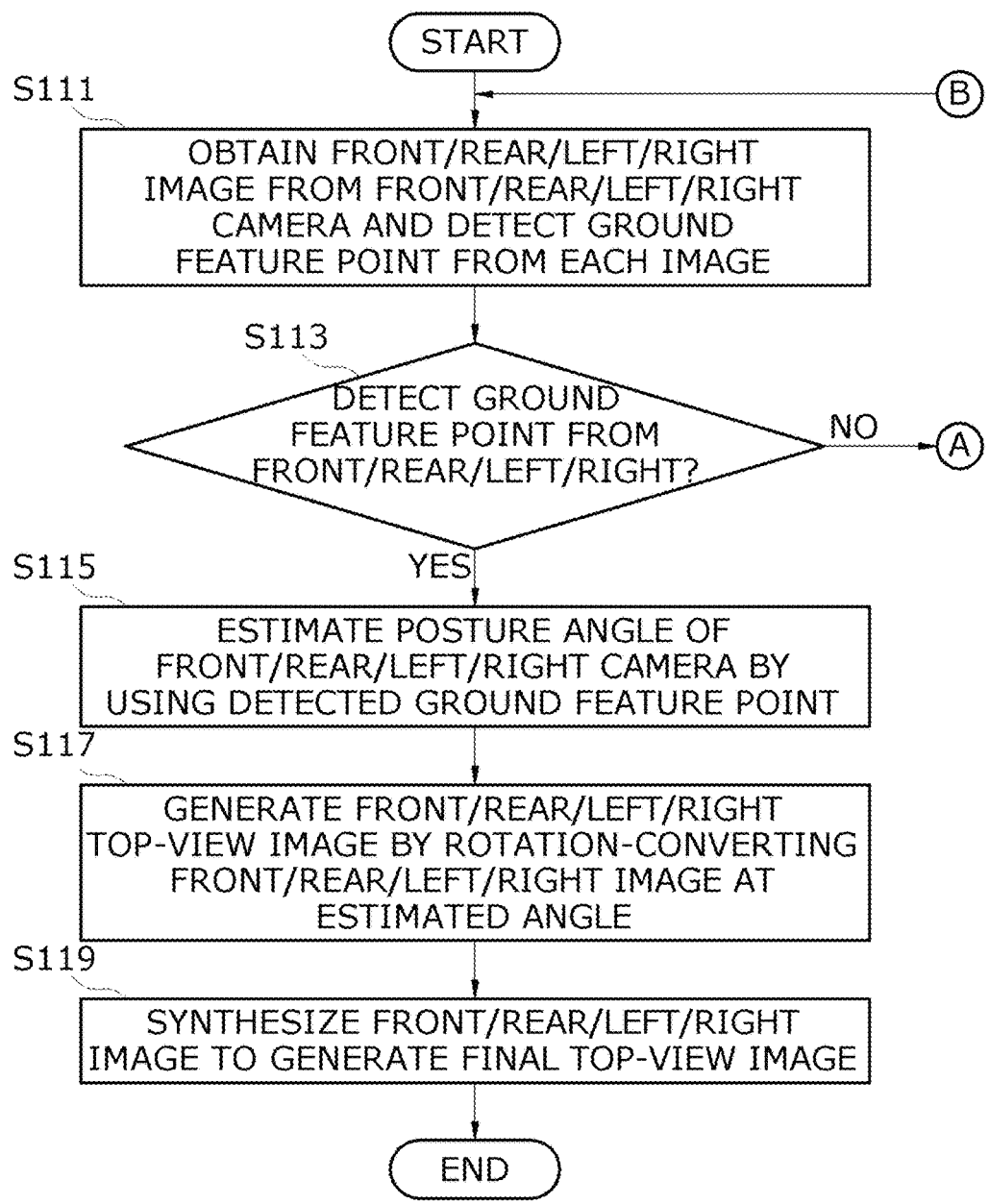

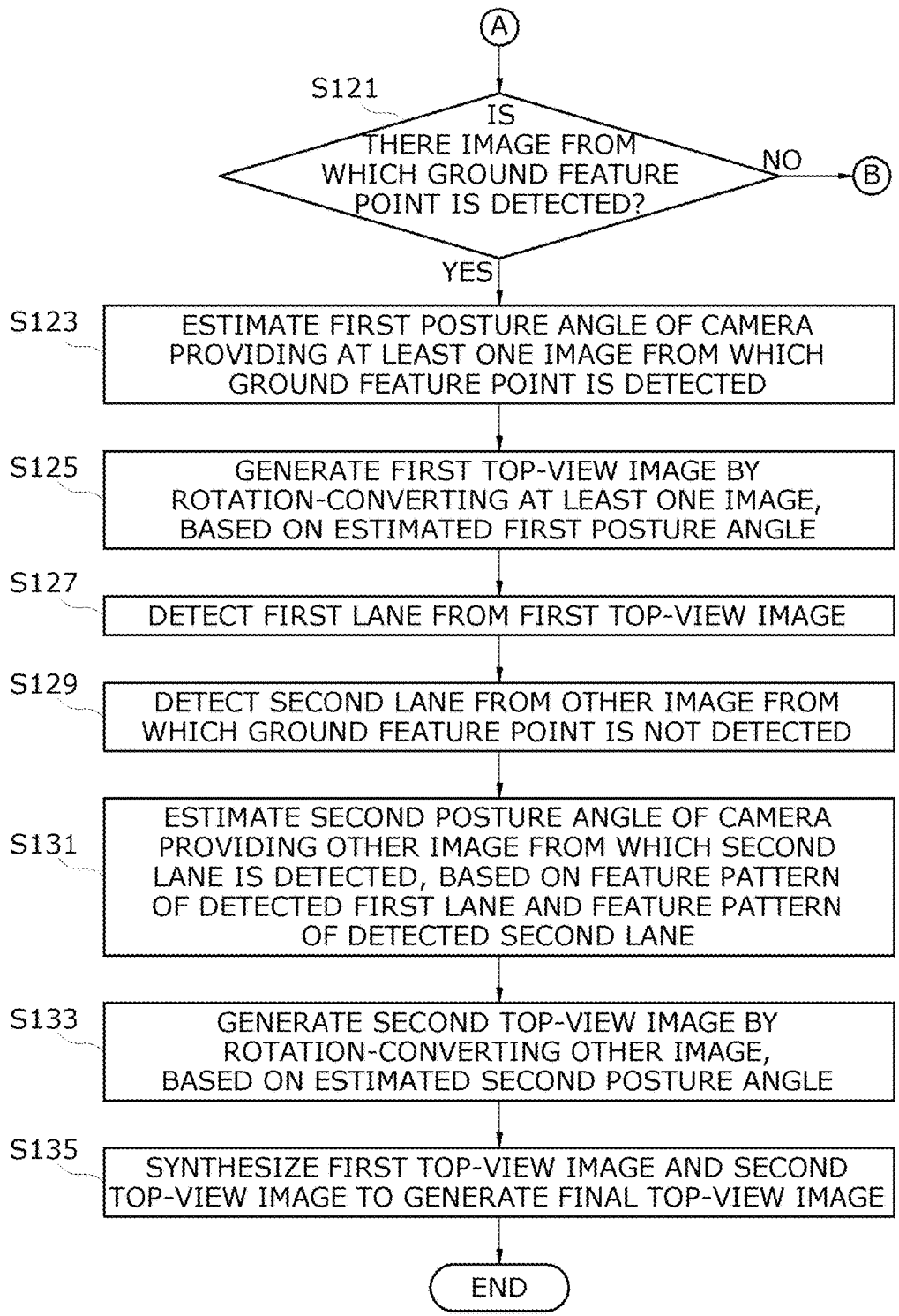

TOP-VIEW IMAGE GENERATING APPARATUS AND METHOD

CROSS-REFERENCE TO RELATED APPLICATIONS

This application claims priority under 35 U.S.C. § 119 to Korean Patent Application No. 10-2016-0104222, filed on Aug. 17, 2016, the disclosure of which is incorporated herein by reference in its entirety.

TECHNICAL FIELD

The present invention relates to a top-view image generating apparatus and method, and more particularly, to a top-view image generating apparatus and method, which generate a top-view image by automatically correcting a camera tolerance when a vehicle is driving on a road.

BACKGROUND

A top-view image generating apparatus is an apparatus which converts a front image, a rear image, a left image, and a right image, obtained from four cameras respectively installed in a front mirror, both side mirrors, and a trunk, into one top-view image having a viewpoint seen from above a vehicle, and is referred to as an around view monitoring (AVM) system.

The top-view image generating apparatus uses an image registration processing technique which converts a front image, a rear image, a left image, and a right image, into one top-view image, and the display quality of a top-view image is determined by registration based on the image registration processing technique.

After a vehicle with cameras installed therein is released, a new camera tolerance occurs in each of the cameras due to a vibration of the vehicle which occur when the vehicle is driving, repeated folding of side mirrors, and repeated opening/closing of a trunk, and an accumulation of the camera tolerance decreases a registration of a top-view image, causing a degradation in display quality of the top-view image.

SUMMARY

Accordingly, the present invention provides a top-view image generating apparatus and method, which automatically correct a camera tolerance even when a vehicle is driving, for improving a registration of a top-view image.

In addition to the aforesaid objects of the present invention, other features and advantages of the present invention will be described below, but will be clearly understood by those skilled in the art from descriptions below.

In one general aspect, a top-view image generating method includes: detecting a ground feature point from at least one of front, rear, left, and right images respectively provided from a plurality of cameras installed in a vehicle; estimating a first posture angle of a camera providing the at least one image, based on the detected ground feature point; generating a first top-view image by rotation-converting the at least one image, based on the estimated first posture angle; detecting a first lane from the first top-view image; detecting a second lane succeeding the first lane from another image, from which the ground feature point is not detected, of the front, rear, left, and right images; estimating a second posture angle of a camera providing the other image from which the second lane is detected, based on a correspondence relationship between a feature pattern of the detected first lane and a feature pattern of the detected second lane; generating a second top-view image by rotation-converting the other image, based on the estimated second posture angle; and synthesizing the first top-view image and the second top-view image to generate a final top-view image.

In another general aspect, a top-view image generating apparatus includes: a ground feature point detector detecting a ground feature point from at least one of front, rear, left, and right images respectively provided from a plurality of cameras installed in a vehicle; a first posture angle estimator estimating a first posture angle of a camera providing the at least one image, based on the detected ground feature point; a first rotation converter generating a first top-view image by rotation-converting the at least one image, based on the estimated first posture angle; a lane detector detecting a first lane from the first top-view image and detecting a second lane succeeding the first lane from another image, from which the ground feature point is not detected, of the front, rear, left, and right images; a second posture angle estimator estimating a second posture angle of a camera providing the other image from which the second lane is detected, based on a correspondence relationship between a feature pattern of the detected first lane and a feature pattern of the detected second lane; a second rotation converter generating a second top-view image by rotation-converting the other image, based on the estimated second posture angle; and an image synthesizer synthesizing the first top-view image and the second top-view image to generate a final top-view image.

Other features and aspects will be apparent from the following detailed description, the drawings, and the claims.

BRIEF DESCRIPTION OF THE DRAWINGS

FIGS. 2A and 2B are diagram for describing the reason that an extraction success rate where a ground feature point is extracted from an image obtained from an arbitrary camera of cameras installed in a vehicle is low.

FIGS. 10 and 11 are flowcharts illustrating a top-view image generating method according to an embodiment of the present invention.

DETAILED DESCRIPTION OF EMBODIMENTS

Figure 1A:
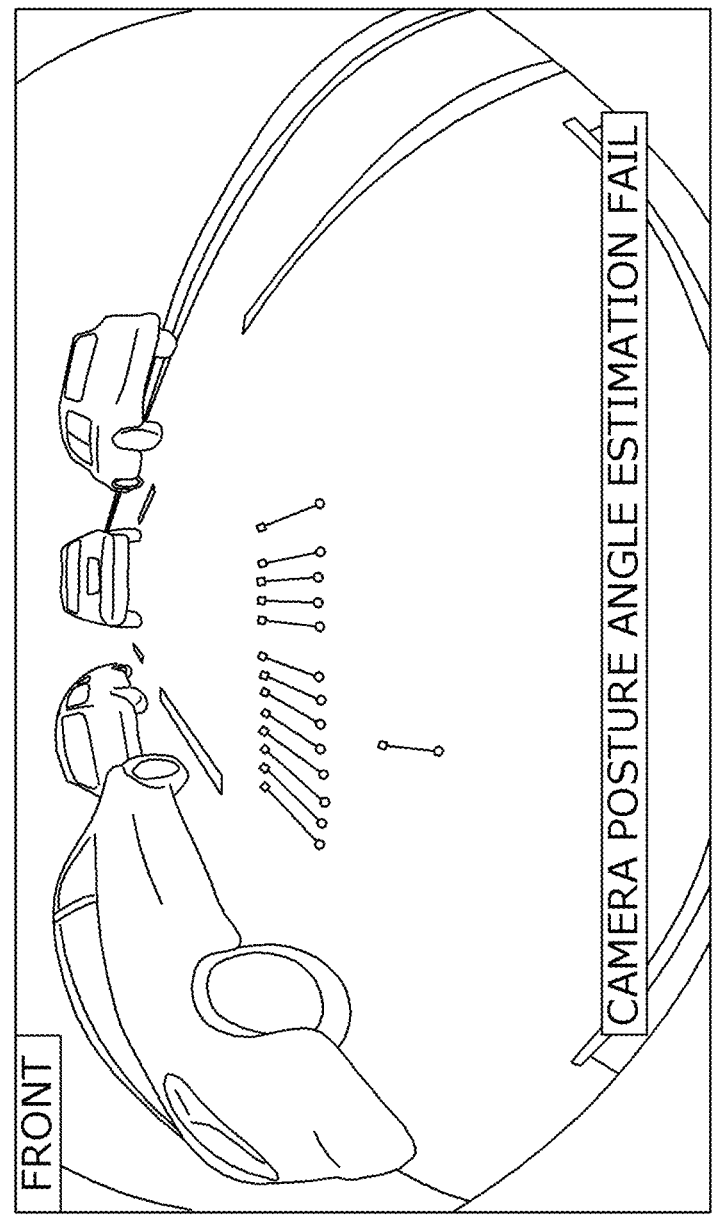
FIGS. 1A to 1D show photographs corresponding to an image, from which a ground feature point is extracted for each of cameras installed in a vehicle, and an image from which a ground feature point is not extracted.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Moreover, each of terms such as " . . . unit", " . . . apparatus" and "module" described in specification denotes an element for performing at least one function or operation.

It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present invention, and similarly, the second element may also be referred to as the first element.

The present invention relates to a top-view image generating apparatus and method, which automatically correct a camera tolerance when a vehicle is driving.

According to an embodiment of the present invention, a camera posture angle may be estimated in real time while a vehicle is driving, front, rear, left, and right images obtained from front, rear, left, and right cameras installed in the vehicle may be rotation-converted based on the estimated camera posture angle, and a top-view image may be generated by synthesizing images obtained through the rotation-conversion, thereby correcting a camera tolerance.

The present invention has one feature where a posture angle of each of the cameras is estimated based on a ground feature point extracted from each of the front, rear, left, and right images obtained from the respective cameras.

The present invention has another feature where when the ground feature point is not extracted from at least one of the front, rear, left, and right images, a lane (or a lane feature point) instead of the ground feature point may be extracted from the at least one image, and a posture angle of a camera providing the at least one image may be estimated based on the extracted lane.

According to an embodiment of the present invention, the ground feature point may be extracted from an image, from which the ground feature point is capable of being extracted, among the front, rear, left, and right images, and a posture angle of a corresponding camera (a camera providing the image from which the ground feature point is capable of being extracted) may be estimated based on the extracted ground feature point. However, a lane (a lane feature point) may be extracted from an image from which the ground feature point is incapable of being extracted, and a posture angle of a corresponding camera (a camera providing the image from which the ground feature point is incapable of being extracted) may be estimated based on the extracted lane.

For reference, the reason that the ground feature point is not extracted from an image is as follows.

Figure 1B:
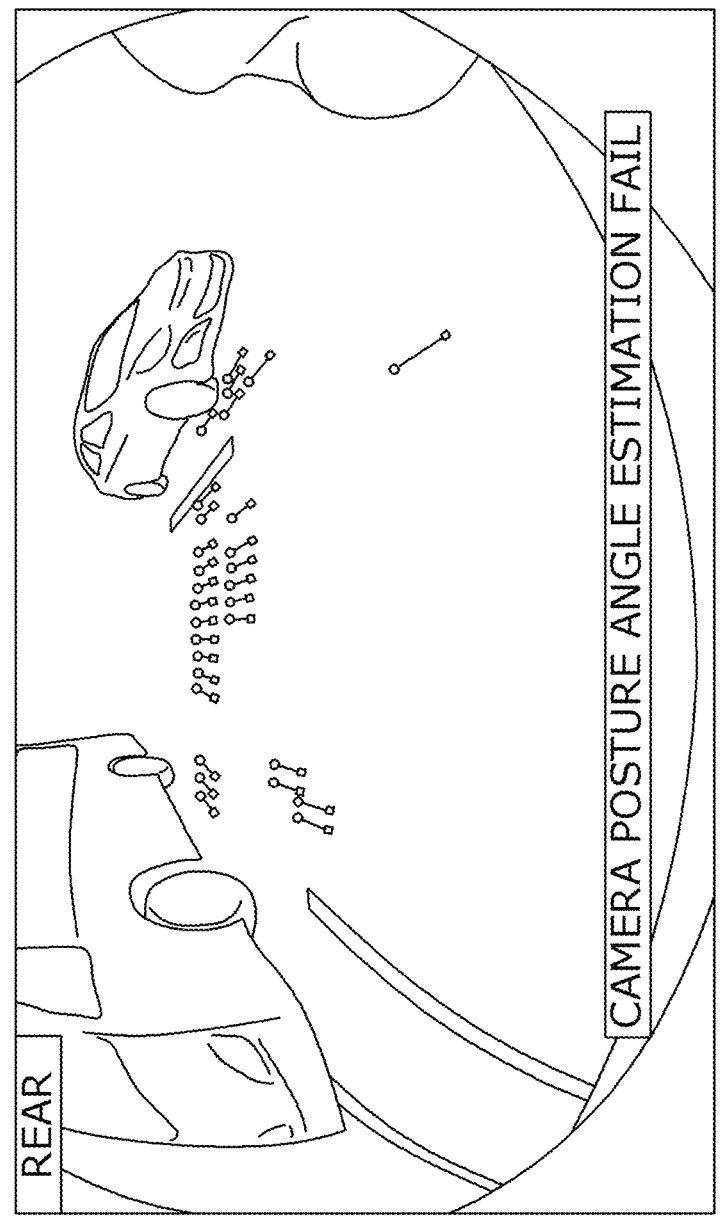

FIGS. 1A to 1D show photographs corresponding to an image, from which a ground feature point is not extracted for each of cameras installed in a vehicle, and an image from which a ground feature point is extracted. FIGS. 1A and 1B respectively show a front image and a rear image from which a ground feature point is not extracted, and FIGS. 1C and 1D respectively show a left image and a right image from which a ground feature point is extracted.

Points and lines shown in FIGS. 1A to 1D represent a trace result obtained by tracing a ground feature point extracted from each of the images, a circular point represents a ground feature point extracted from a previous image, a tetragonal point represents a ground feature point extracted from a current image, and the lines denote a movement vector which connect the ground feature point extracted from the previous image and the ground feature point extracted from the current image.

Figure 1C:
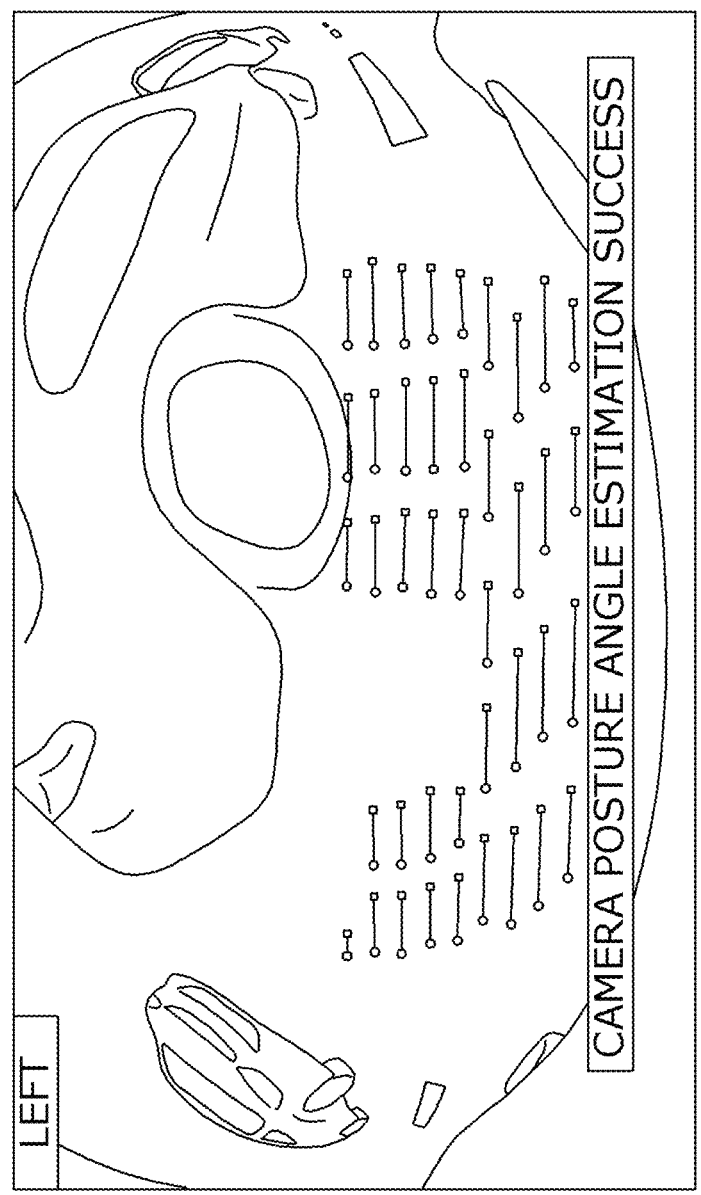
Figure 1D:
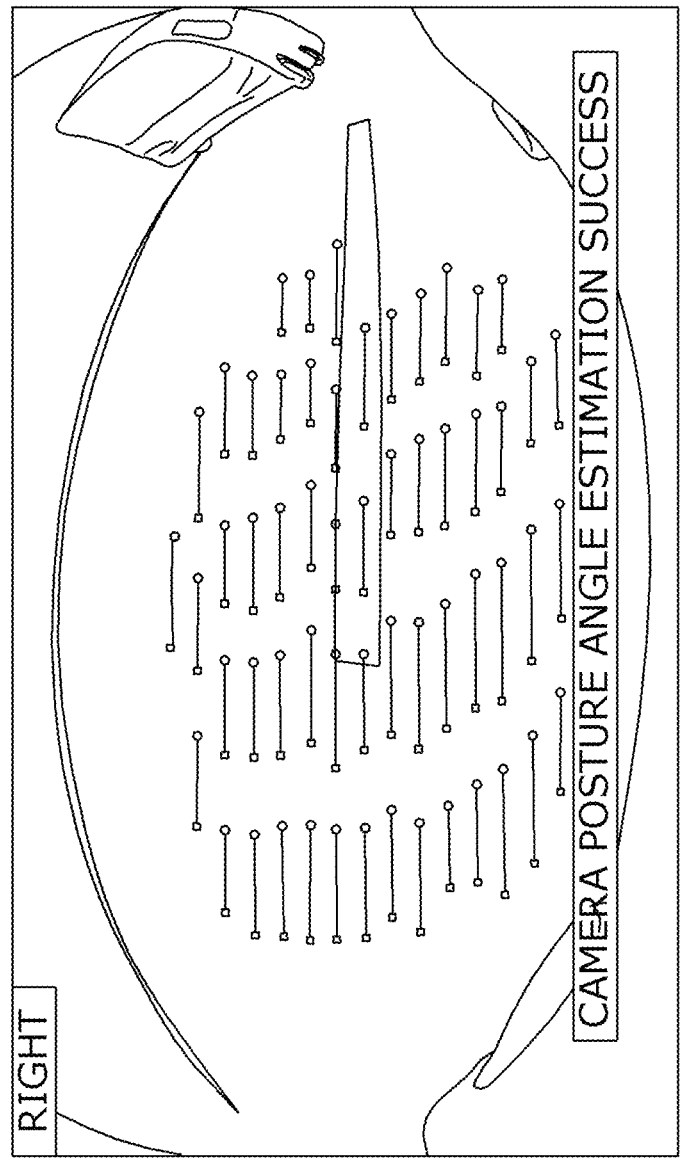

As seen in FIGS. 1C and 1D, in the left and right images, a ground feature point and a movement vector of the ground feature point are shown in a wide area, and as seen in FIGS. 1A and 1B, in the front and rear images, a ground feature point and a movement vector of the ground feature point are shown in a narrow area. This denotes that a trace result obtained by tracing the ground feature point in the front and rear images FIGS. 1A and 1B is better than a trace result obtained by tracing the ground feature point in the left and right FIGS. 1C and 1D.

Figure 2B:
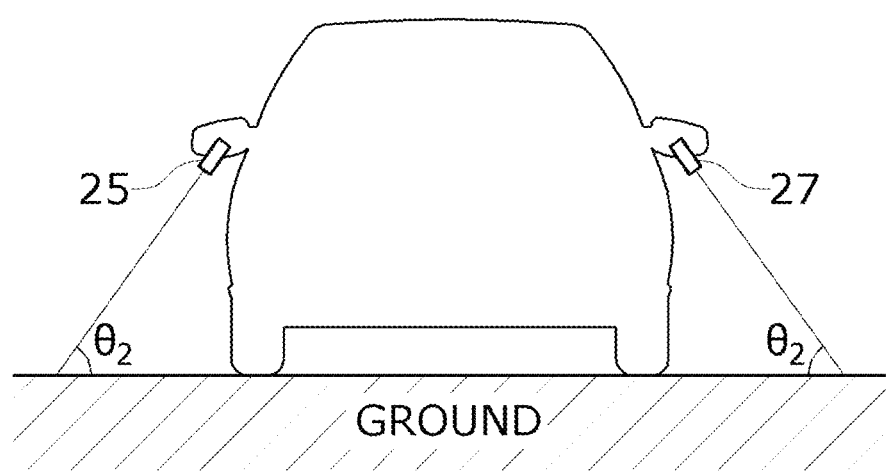

The reason that the trace result obtained by tracing the ground feature point is better in front and rear images FIGS. 1c and 1d than the left and right images (a) and (b) is because an angle "$\theta_1$" between the ground and an optical axis of a front/rear camera 21 or 23 in FIG. 2A is less than an angle "$\theta_2$" between the ground and an optical axis of a left/right camera 25 or 27 in FIG. 2B.

In a front/rear camera mainly installed in a bonnet of a vehicle, a viewing angle of the front/rear camera is limited due to a structure such as a bumper (a front bumper and a rear bumper). Therefore, in the front/rear camera, an angle between an optical axis and the ground is narrowly set, and thus, the front/rear camera is installed in the vehicle. However, in left and right cameras mainly installed in lower ends of both side mirrors of the vehicle, since there is no structure obstructing a viewing angle, an angle "$\theta_2$" between the ground and an optical axis is relatively largely set, and the left and right cameras may be installed in the vehicle.

As well known, an extraction success rate for a ground feature point is high in an image obtained from a camera having an optical axis vertical to the ground. Therefore, as shown in FIGS. 1A, 1B 1C and 1D, an extraction success rate is higher in an image, obtained from a left/right camera 25 or 27, than an image obtained from a front/rear camera 21 or 23.

In the following embodiments, a detailed description will be made. It is assumed that an operation of estimating a posture angle of a camera based on a ground feature point is performed on only a left/right camera, and an operation of estimating a posture angle of a camera based on a lane is performed on only a front/rear camera.

Figure 3:
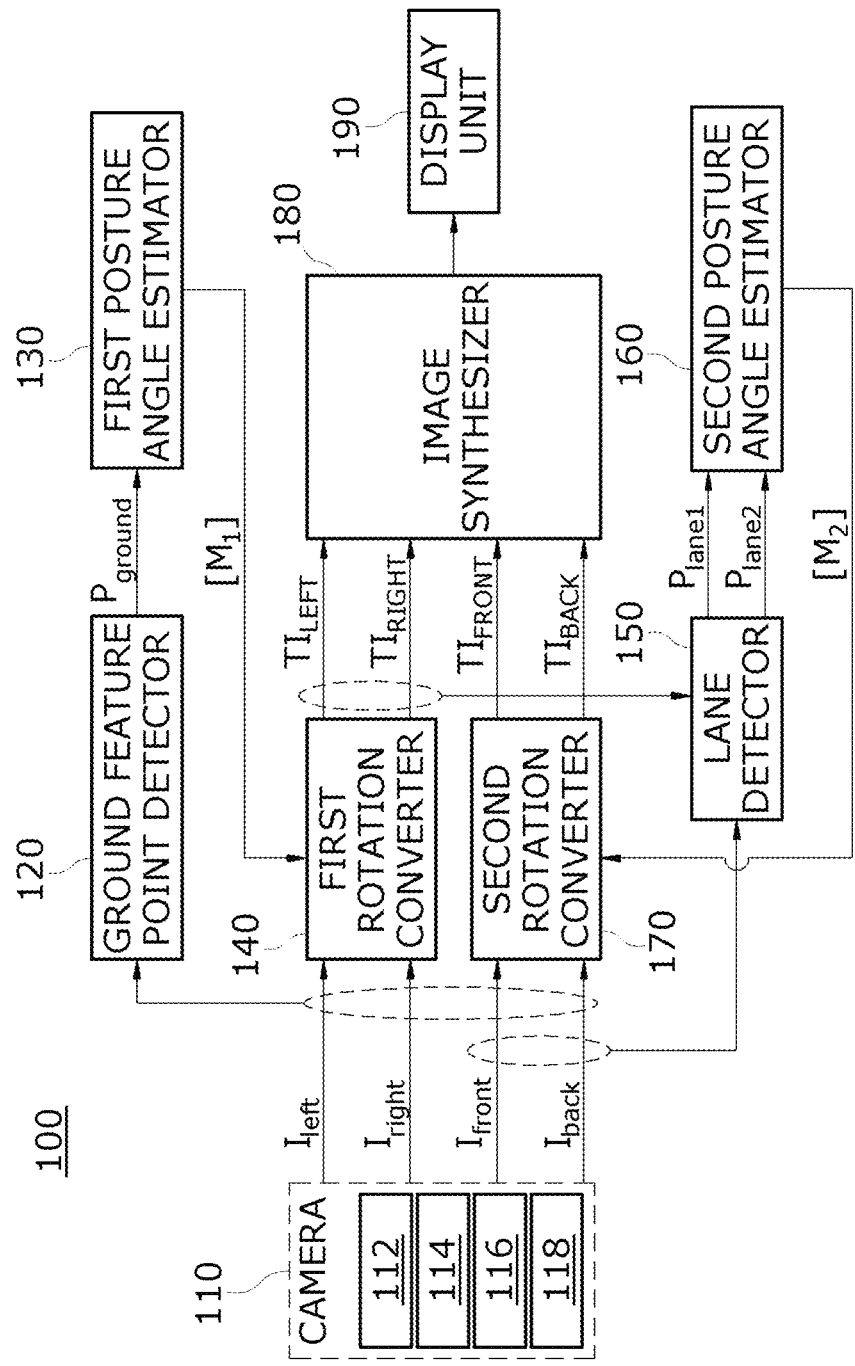
FIG. 3 is a block diagram of a top-view image generating apparatus according to an embodiment of the present invention.

FIG. 3 is a block diagram of a top-view image generating apparatus 100 according to an embodiment of the present invention.

Referring to FIG. 3, the top-view image generating apparatus 100 according to an embodiment of the present invention may include a camera 110, a ground feature point detector 120, a first posture angle estimator 130, a first rotation converter 140, a lane detector 150, a second posture angle estimator 160, a second rotation converter 170, an image synthesizer 180, and a display unit 190.

The camera 110 may include a left camera 112, a right camera 114, a front camera 116, and a rear camera 118 which are installed in a vehicle. The left camera 112 may photograph a left ground of the vehicle to generate a left image $I_{left}$ in units of one frame, and the left camera 112 may photograph a right ground of the vehicle to generate a right image $I_{right}$ in units of one frame. The front camera 116 may photograph a front ground of the vehicle to generate a front image $I_{front}$ in units of one frame, and the rear camera 118 may photograph a rear ground of the vehicle to generate a rear image $I_{rear}$ in units of one frame.

The ground feature point detector 120 may detect a ground feature point $P_{ground}$ and a movement vector of the ground feature point $P_{ground}$ from at least one image, from which the ground feature point $P_{ground}$ is capable of being extracted, of the left, right, front, and rear images $I_{left}$, $I_{right}$, $I_{front}$, and $I_{back}$ respectively provided from the cameras 112, 114, 116, and 118 in units of one frame. Here, the at least one image may include the left and right images $I_{left}$ and $I_{right}$. A method of detecting the ground feature point $P_{ground}$ and the movement vector of the ground feature point $P_{ground}$ may use an optical flow-based feature extraction algorithm such as a block matching method, an Horn-Schunk algorithm, a Lucas-Kanade algorithm, a Gunnar Farneback's algorithm, or the like. Each of the algorithms is technology well known in those skilled in the art. The algorithms are irrelevant to the feature of the present invention, and thus, their detailed descriptions are omitted.

The first posture angle estimator 130 may estimate a first posture angle of each of the left and right cameras 112 and 114, based on the ground feature point $P_{ground}$ and the movement vector of the ground feature point $P_{ground}$ and may generate a conversion matrix $[M_1]$ which represents the estimated first posture angle in a matrix type. A method, performed by the first posture angle estimator 130, of estimating the first posture angle of each of the left and right cameras 112 and 114 will be described below in detail with reference to FIG. 4.

The first rotation converter 140 may rotation-convert each of the left and right images $I_{left}$ and $I_{right}$ by using the conversion matrix $[M_1]$ input from the first posture angle estimator 130 to generate a first top-view image corresponding to a top-view viewpoint. Here, the first top-view image may include a left top-view image $TI_{LEFT}$ generated by rotation-converting the left image $I_{left}$ with the conversion matrix $[M_1]$, and a right top-view image $TI_{RIGHT}$ generated by rotation-converting the right image $I_{right}$ with the conversion matrix $[M_1]$.

The lane detector 150 may detect a first lane $P_{lane1}$ from each of the left top-view image $TI_{LEFT}$ and the right top-view image $TI_{RIGHT}$ input from the first rotation converter 140. Here, the first lane $P_{lane1}$ may include a left lane detected from the left top-view image $TI_{LEFT}$ and a right lane detected from the right top-view image $TI_{RIGHT}$.

A method of detecting the left lane and the right lane from the left top-view image $TI_{LEFT}$ and the right top-view image $TI_{RIGHT}$ may use a lane detection algorithm. The lane detection algorithm is irrelevant to the feature of the present invention, and thus, its detailed description is omitted. Also, technology where a lane and lane-related information such as a thickness of the lane, a direction of the lane, and the like are obtained through the lane detection algorithm is technology well known in those skilled in the art, and thus, its detailed description is also omitted.

Moreover, the lane detector 150 may a second lane $P_{lane2}$ succeeding the first lane $P_{lane1}$ from each of the left and right images $I_{left}$ and $I_{right}$ input from the camera 110. Here, the second lane $P_{lane2}$ may include a left lane succeeding a left lane detected from the left top-view image $TI_{LEFT}$ and a right lane succeeding a right lane detected from the right top-view image $TI_{RIGHT}$. That is, due to an installation environment where the front and rear cameras 116 and 118 are installed in the vehicle, the lane detector 150 may detect the left lane and the right lane from the other images (i.e., the front and rear images $I_{front}$ and $I_{back}$) where an extraction success rate for a ground feature point is low. A method of detecting the left lane and the right lane from the front and rear images $I_{front}$ and $I_{back}$ may use the lane detection algorithm identically to the method of detecting the first lane $P_{lane1}$.

The second posture angle estimator 160 may estimate a second posture angle of each of the front and rear cameras 116 and 118 providing the front and rear images $I_{front}$ and $I_{back}$ from which the second lane $P_{lane2}$ is detected, based on a correspondence relationship between a feature pattern of the first lane $P_{lane1}$ and a feature pattern of the second lane $P_{lane2}$ input from the lane detector 150, and may generate a conversion matrix $[M_2]$ which represents the estimated second posture angle in a matrix type. A method, performed by the second posture angle estimator 160, of estimating the second posture angle of each of the front and rear cameras 116 and 118 will be described below in detail with reference to FIG. 5.

The second rotation converter 170 may rotation-convert each of the front and rear images $I_{front}$ and $I_{back}$ by using the conversion matrix $[M_2]$ input from the second posture angle estimator 160 to generate a second top-view image corresponding to a top-view viewpoint. Here, the second top-view image may include a front top-view image $TI_{FRONT}$ generated by rotation-converting the front image $I_{front}$ with the conversion matrix $[M_2]$, and a rear top-view image $TI_{BACK}$ generated by rotation-converting the rear image $I_{back}$ with the conversion matrix $[M_2]$.

The image synthesizer 180 may synthesize the first top-view image (i.e., the left top-view image $TI_{LEFT}$ and the right top-view image $TI_{RIGHT}$) input from the first rotation converter 140 and the second top-view image (i.e., the front top-view image $TI_{FRONT}$ and the rear top-view image $TI_{BACK}$) input from the first rotation converter 140 to generate a final top-view image.

The display unit 190 may display the final top-view image input from the image synthesizer 180.

Figure 4:
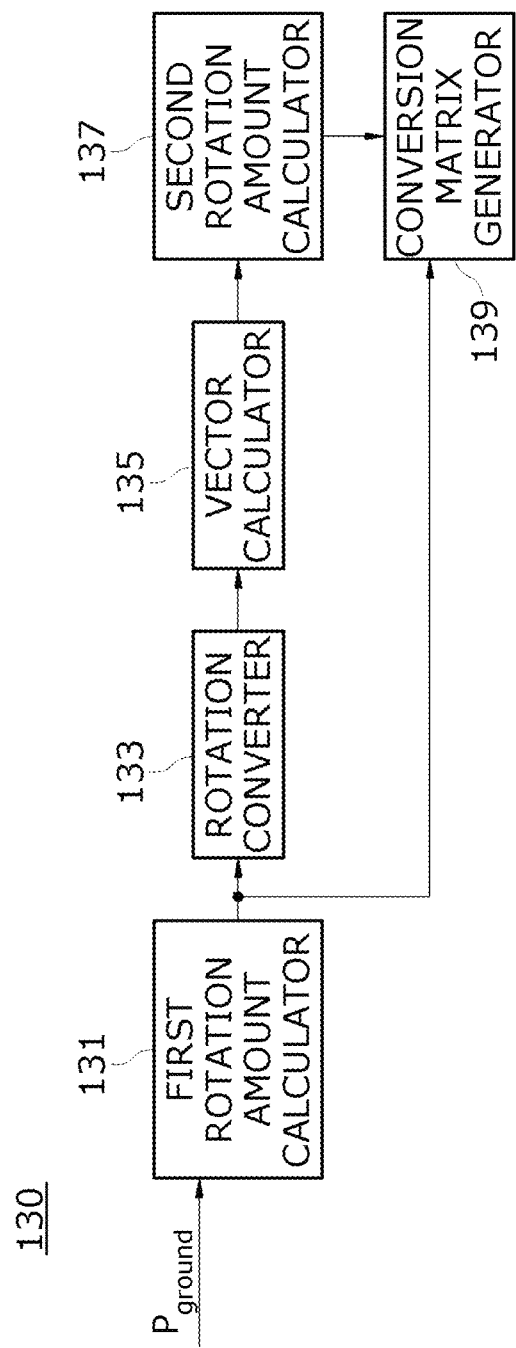
FIG. 4 is a function block diagram illustrating an internal configuration of a first posture angle estimator illustrated in FIG. 3.

FIG. 4 is a function block diagram illustrating an internal configuration of the first posture angle estimator 130 illustrated in FIG. 3.

Referring to FIG. 4, as described above, the first posture angle estimator 130 may estimate a posture angle of each of the first and second cameras 112 and 114, based on a ground feature point defected from each of the left and right images $I_{left}$ and $I_{right}$ where an extraction success rate for the ground feature point is high.

To this end, the first posture angle estimator 130 may include a first rotation amount calculator 131, a rotation converter 133, a vector calculator 135, a second rotation amount calculator 137, and a conversion matrix generator 139.

First Rotation Amount Calculator 131

The first rotation amount calculator 131 may calculate the amount of pitch-direction rotation and the amount of yaw-direction rotation (or a rotation angle) for rotation-converting the left image $I_{left}$ into the left top-view image $TI_{LEFT}$ by using the ground feature point $P_{ground}$ detected from the ground feature point detector 120.

In this manner, the first rotation amount calculator 131 may calculate the amount of pitch-direction rotation and the amount of yaw-direction rotation for rotation-converting the right image $I_{right}$ into the right top-view image $TI_{RIGHT}$.

Hereinafter, an operation, performed by the first rotation amount calculator 131, of calculating the amount of pitch-direction rotation and the amount of yaw-direction rotation will be described in detail. However, for conciseness of description, an operation of calculating the amount of pitch-direction rotation and the amount of yaw-direction rotation for the left image $I_{left}$ will be described, and the description of the operation of calculating the amount of pitch-direction rotation and the amount of yaw-direction rotation for the left image $I_{left}$ is applied to an operation of calculating the amount of pitch-direction rotation and the amount of yaw-direction rotation for the right image $I_{right}$.

First, an operation of sequentially receiving a previous ground feature point $P_{ground}$ detected from a left image $I_{left}$ corresponding to a previous time (or a previous frame) and a current ground feature point $P_{ground}$ detected from a left image $I_{left}$ corresponding to a previous time (or a previous frame) may be performed.

Subsequently, an operation of analyzing a geometric relationship between the previous ground feature point $P_{ground}$ and the current ground feature point $P_{ground}$ may be performed. An example of representing the geometric relationship between the previous ground feature point $P_{ground}$ and the current ground feature point $P_{ground}$ is illustrated in FIG. 5(A).

In FIG. 5(A), $P1_{n-1}$ and $P2_{n-1}$ indicate previous ground feature points detected from a left image $I_{left}$ corresponding to a previous time, and $P1_n$ and $P2_n$ indicate current ground feature points detected from a left image $I_{left}$ corresponding to a current time. $d_1$ indicates a distance between $P1_n$ and $P2_n$, $d_2$ indicates a distance between $P1_{n-1}$ and $P2_{n-1}$, $d_3$ indicates a moving distance of $P1_{n-1}$, and $d_4$ indicates a moving distance of $P2_{n-1}$. In this case, a geometric relationship is defined as a relationship between $d_1$ and $d_2$ and a relationship between $d_3$ and $d_4$.

Subsequently, an operation of calculating the amount of pitch-direction rotation and the amount of yaw-direction rotation in order for the above analyzed geometric relationship to satisfy a predetermined geometric condition may be performed. An example of representing the predetermined geometric condition is illustrated in FIG. 5(B). Referring to FIG. 5(B), when the geometric relationship illustrated in FIG. 5(A) is assumed, the geometric condition may include a condition where $d_1$ matches $d_2$ and a condition where $d_3$ matches $d_4$. That is, the amount of pitch-direction rotation and the amount of yaw-direction rotation for the left image $I_{left}$ may be calculated to satisfy $d_1=d_2$ and $d_3=d_4$. A method of calculating the amount of pitch-direction rotation and the amount of yaw-direction rotation may use a Gauss-Newton method expressed as the following Equation (1):

$$\operatorname{argmin} \{\Sigma(d_1-d_2)^2+\Sigma(d_3-d_4)^2\} \qquad (1)$$

Figure 6:
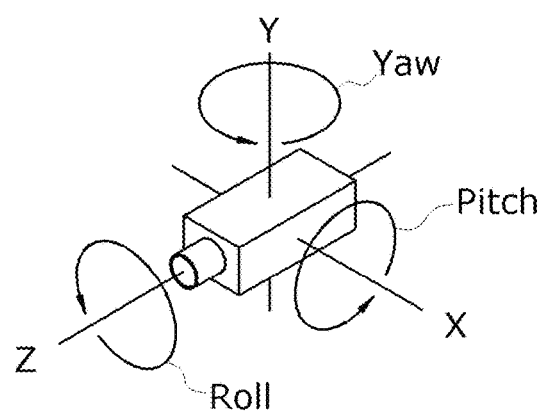
FIG. 6 is a diagram schematically illustrating a pitch direction, a yaw direction, and a roll direction in a camera coordinate system.

FIG. 6 is a diagram schematically illustrating a pitch direction and a yaw direction represented in a camera coordinate system.

Rotation Converter 133

The rotation converter 133 may rotation-convert the left image $I_{left}$ and the right image $I_{right}$ by the amount of pitch-direction rotation and the amount of yaw-direction rotation, calculated by the first rotation amount calculator 131, for the left image $I_{left}$ and right image $I_{right}$ to generate a middle top-view image corresponding to the left image $I_{left}$ and a middle top-view image corresponding to the right image $I_{right}$ in units of one frame.

Vector Calculator 135

The vector calculator 135 may detect the previous ground feature point from the middle top-view image generated by the rotation converter 133 at the previous time and may detect the current ground feature point from the middle top-view image generated by the rotation converter 133 at the current time, and then, may calculate a movement vector of a ground feature point shown in a top-view coordinate system by using the previous ground feature point and the current ground feature point.

Subsequently, the vector calculator 135 may calculate a prediction movement vector of the ground feature point shown in the top-view coordinate system based on a moving direction of the vehicle. That is, the vector calculator 135 may predict a prediction movement vector of the ground feature point which is the same as the moving direction of the vehicle.

Figure 7:
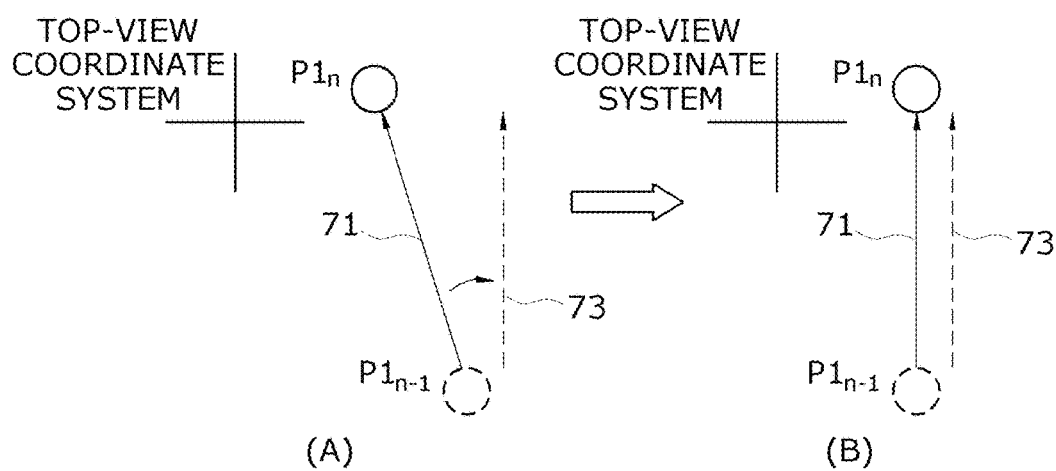
FIG. 7 is a diagram illustrating a movement vector of a ground feature point shown in a top-view coordinate system and a prediction movement vector of a ground feature point based on a movement of a vehicle, according to an embodiment of the present invention.

In FIG. 7(A), an example of a movement vector 71 of the ground feature point shown in the top-view coordinate system and a prediction movement vector 73 of the ground feature point shown in the top-view coordinate system based on the moving direction of the vehicle is illustrated.

Second Rotation Amount Calculator 137

The second rotation amount calculator 137 may calculate the amount of roll-direction rotation (or a rotation angle) for allowing a direction of the movement vector to match a direction of the prediction movement vector with respect to the top-view coordinate system. In FIG. 6, a roll direction represented in the camera coordinate system is illustrated.

In FIG. 7(B), an example of rotating the movement vector 71 by the calculated amount of roll-direction rotation to allow a direction of the movement vector 71 to match a direction of the prediction movement vector 73 is illustrated.

Conversion Matrix Generator 139

The conversion matrix generator 139 may generate the conversion matrix $[M_1]$ which represents the first posture angle (the posture angle of the left/right camera) in a matrix type and includes the amount of roll-direction rotation calculated by the second rotation amount calculator 137 and the amount of pitch-direction rotation and the amount of yaw-direction rotation calculated by the first rotation amount calculator 131.

Figure 8:
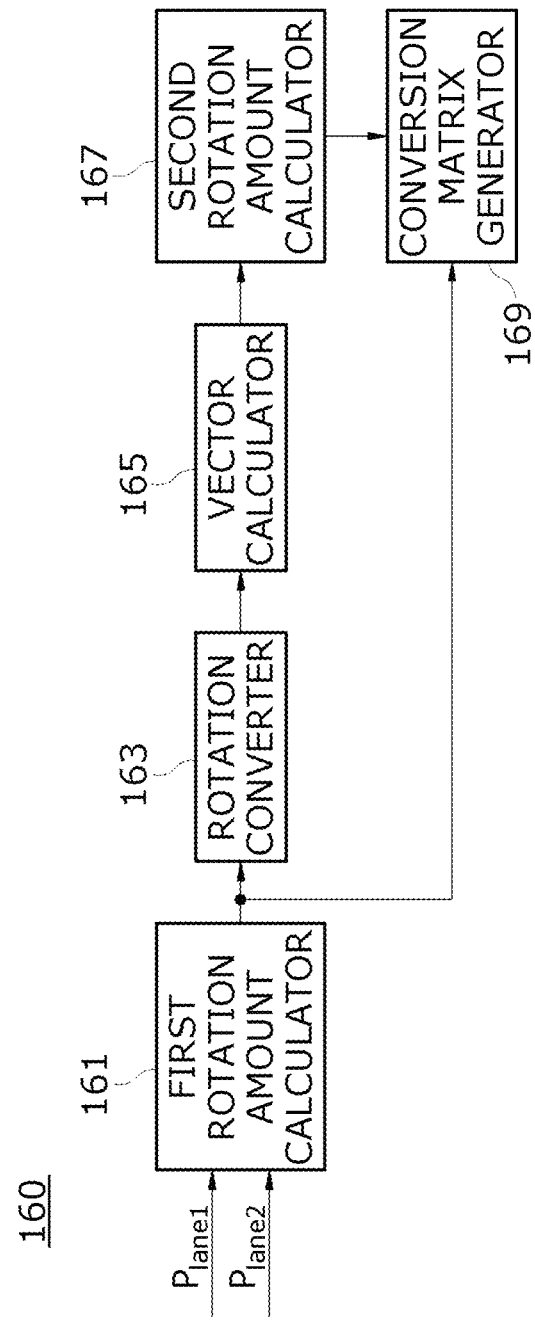
FIG. 8 is a function block diagram illustrating an internal configuration of a second posture angle estimator illustrated in FIG. 3.

FIG. 8 is a function block diagram illustrating an internal configuration of the second posture angle estimator 160 illustrated in FIG. 3.

Referring to FIG. 8, the second posture angle estimator 160 may estimate the second posture angle of each of the front and rear cameras 116 and 118 providing the front and rear images $I_{front}$ and $I_{back}$ from which the second lane $P_{lane2}$ is detected, based on the feature pattern of the first lane $P_{lane1}$ detected from each of the left top-view image $TI_{LEFT}$ and the right top-view image $TI_{RIGHT}$ and may generate the conversion matrix [$M_2$] which represents the estimated second posture angle in a matrix type.

To this end, the second posture angle estimator 160 may include a first rotation amount calculator 161, a rotation converter 163, a vector calculator 165, a second rotation amount calculator 165, and a conversion matrix generator 169.

First Rotation Amount Calculator 161

The first rotation amount calculator 161 may compare the feature pattern of the first lane $P_{lane1}$, detected from each of the left top-view image $TI_{LEFT}$ and the right top-view image $TI_{RIGHT}$ corresponding to a top-view viewpoint, with the feature pattern of the second lane $P_{lane2}$ detected from each of the front and rear images $I_{front}$ and $I_{back}$ instead of the top-view viewpoint, thereby calculating the amount of pitch-direction rotation and the amount of yaw-direction rotation from the front and rear images $I_{front}$ and $I_{back}$, from which the second lane $P_{lane2}$ is detected, in order for the feature pattern of the first lane $P_{lane1}$ to match the feature pattern of the second lane $P_{lane2}$. Here, the feature pattern may include a lane direction and a lane thickness (or a lane width).

In detail, a calculation operation performed by the first rotation amount calculator 161 will be described with reference to FIGS. 9A to 9D. A black line marked on each image of FIGS. 9A to 9D indicates a lane.

Figure 9A:
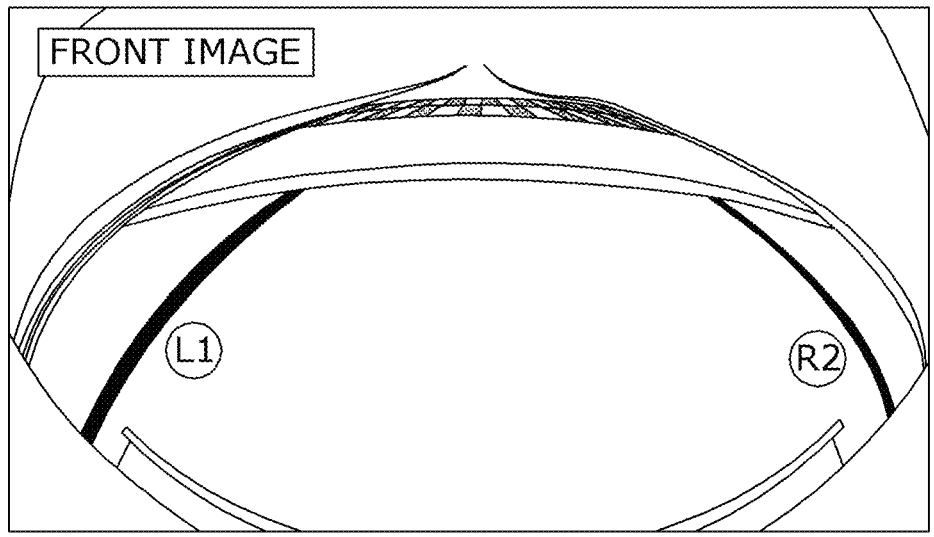
FIGS. 9A to 9D show images of lanes detected from a front/rear image and lanes detected from a left/right top-view image, according to an embodiment of the present invention.
Figure 9B:
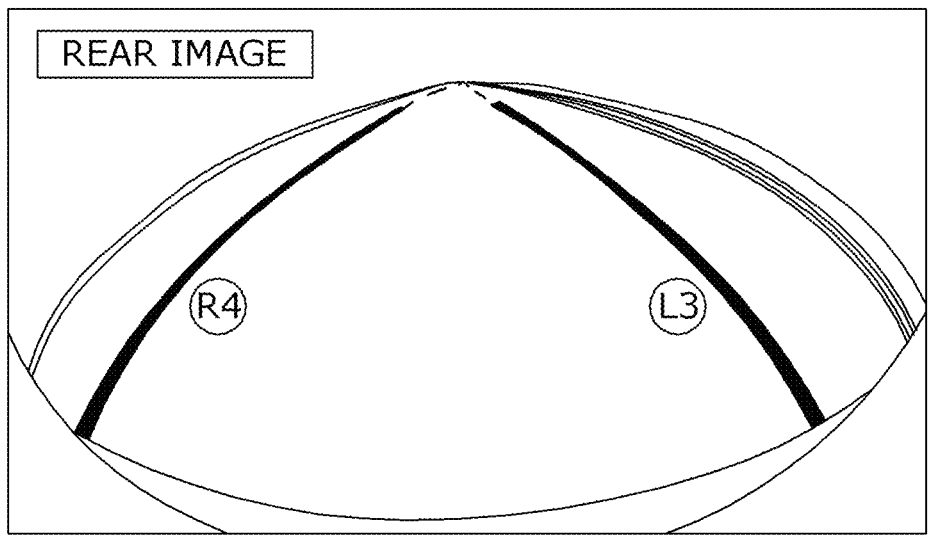
Figure 9C:
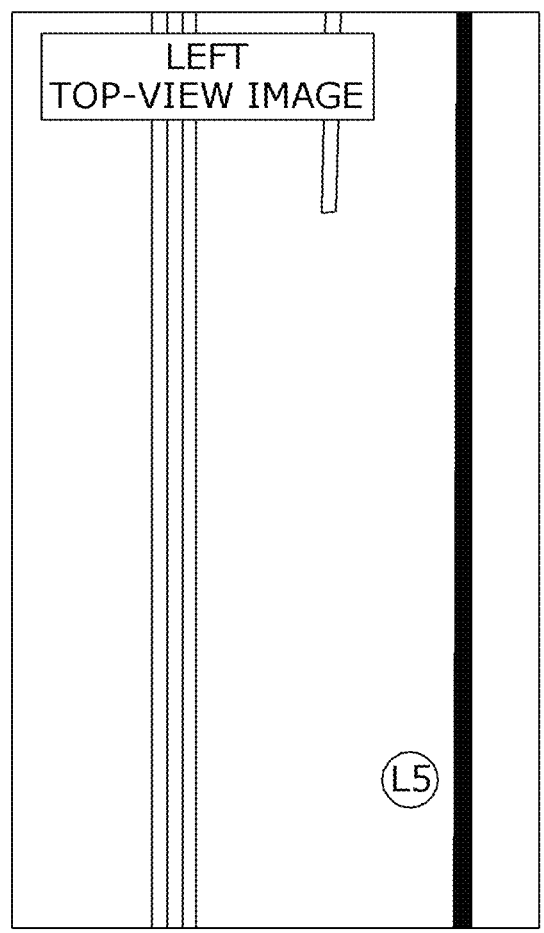
Figure 9D:
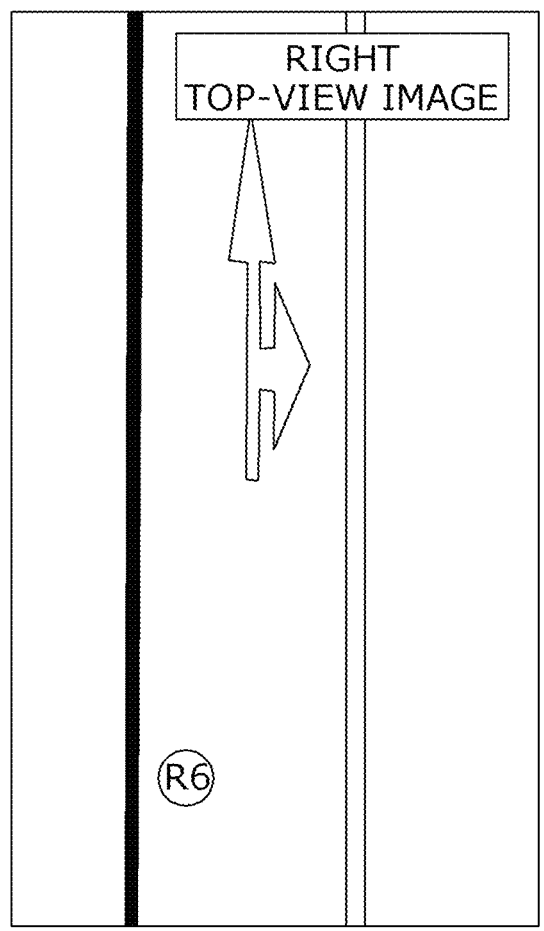

First, the first rotation amount calculator 161 may calculate the amount of pitch-direction rotation and the amount of yaw-direction rotation from the front image $I_{front}$ so that a feature pattern (a lane direction and a lane thickness) of a left lane L1 detected from the front image $I_{front}$ illustrated in FIG. 9A matches a feature pattern (a lane direction and a lane thickness shown in the top-view coordinate system) of a left lane L5, succeeding the left lane L1, defected from the left top-view image $TI_{LEFT}$ illustrated in FIG. 9C Optionally, the first rotation amount calculator 161 may calculate the amount of pitch-direction rotation and the amount of yaw-direction rotation from the front image $I_{front}$ so that a feature pattern (a lane direction and a lane thickness) of a right lane R2 detected from the front image $I_{front}$ matches a feature pattern (the lane direction and the lane thickness shown in the top-view coordinate system) of a right lane R6, succeeding the right lane R2, defected from the right top-view image $TI_{RIGHT}$ illustrated in FIG. 9D.

Moreover, the first rotation amount calculator 161 may calculate a final rotation amount corresponding to the amount of pitch-direction rotation and the amount of yaw-direction rotation of the front image $I_{front}$, based on the amount of pitch-direction rotation and the amount of yaw-direction rotation of the front image $I_{front}$ calculated with respect to a left lane of the left top-view image $TI_{LEFT}$ and the amount of pitch-direction rotation and the amount of yaw-direction rotation of the front image $I_{front}$ calculated with respect to a right lane of the right top-view image $TI_{RIGHT}$.

In this manner, the first rotation amount calculator 161 may calculate the amount of pitch-direction rotation and the amount of yaw-direction rotation from the rear image $I_{back}$. That is, the first rotation amount calculator 161 may calculate the amount of pitch-direction rotation and the amount of yaw-direction rotation from the rear image $I_{back}$ illustrated in FIG. 9B so that a feature pattern (a lane direction and a lane thickness) of a left lane L3 detected from the rear image $I_{back}$ matches the feature pattern (the lane direction and the lane thickness shown in the top-view coordinate system) of the left lane L5, succeeding the left lane L3, defected from the left top-view image $TI_{LEFT}$.

Optionally, the first rotation amount calculator 161 may calculate the amount of pitch-direction rotation and the amount of yaw-direction rotation from the rear image $I_{back}$ so that a feature pattern (a lane direction and a lane thickness) of a right lane R4 detected from the rear image $I_{back}$ matches the feature pattern (the lane direction and the lane thickness shown in the top-view coordinate system) of the right lane R6, succeeding the right lane R4, defected from the right top-view image $TI_{RIGHT}$.

Moreover, the first rotation amount calculator 161 may calculate a final rotation amount corresponding to the amount of pitch-direction rotation and the amount of yaw-direction rotation of the rear image $I_{back}$, based on the amount of pitch-direction rotation and the amount of yaw-direction rotation of the rear image $I_{back}$ calculated with respect to the left lane L5 of the left top-view image $TI_{LEFT}$ and the amount of pitch-direction rotation and the amount of yaw-direction rotation of the rear image $I_{back}$ calculated with respect to the right lane R6 of the right top-view image $TI_{RIGHT}$.

Rotation Converter 163

Referring again to FIG. 8, the rotation converter 163 may rotation-convert the left image $I_{left}$ and the right image $I_{right}$ by the amount of pitch-direction rotation and the amount of yaw-direction rotation calculated by the first rotation amount calculator 161 to generate a middle top-view image corresponding to the left image $I_{left}$ and a middle top-view image corresponding to the right image $I_{right}$ in units of one frame.

Vector Calculator 165

The vector calculator 165 may calculate a movement vector of a lane feature point based on a moving direction of the vehicle by using a previous lane feature point detected from a middle top-view image generated at a previous time and a current lane feature point detected from a middle top-view image generated at a current time and may calculate a prediction movement vector of the lane feature point based on the moving direction of the vehicle.

Figure 5:
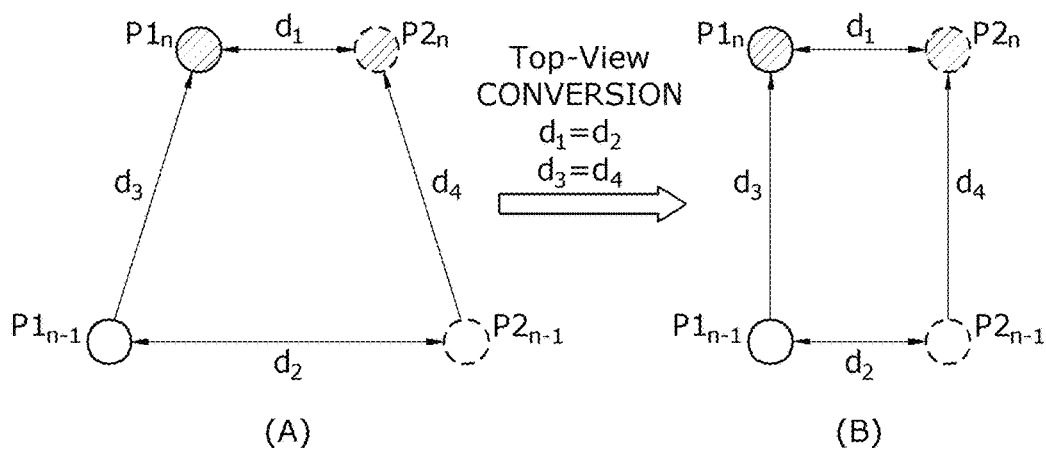
FIG. 5 is a diagram schematically illustrating a predetermined geometric condition and a geometric relationship between a previous ground feature point and a current ground feature point, according to an embodiment of the present invention.

Since the middle top-view image generated by the rotation converter 163 is an image generated through rotation-conversion from a front/rear image from which a ground feature point is not detected, the vector calculator 165 has a difference with the vector calculator 135 of FIG. 5 in that the vector calculator 165 calculates a prediction movement vector and a movement vector of a lane feature point instead of a ground feature point.

Second Rotation Amount Calculator 167

Through the same operation as a processing operation performed by the vector calculator 135 of FIG. 5, the second rotation amount calculator 167 may calculate the amount of roll-direction rotation for allowing a direction of the movement vector of the lane feature point to match a direction of the prediction movement vector based on the moving direction of the vehicle.

Conversion Matrix Generator 169

The conversion matrix generator 169 may generate the conversion matrix [$M_2$] which represents the second posture angle in a matrix type and includes the amount of roll-direction rotation, the amount of pitch-direction rotation, and the amount of yaw-direction rotation.

FIGS. 10 and 11 are flowcharts illustrating a top-view image generating method according to an embodiment of the present invention. In the following steps, details which are the same as or similar to the details described above with reference to FIGS. 1 to 9 will be briefly described or are omitted.

Referring to FIG. 10, first, in step S111, front, rear, left, and right images may be respectively obtained from front, rear, left, and right cameras, and then, a ground feature point may be detected from each of the images by using a feature point extraction algorithm.

Subsequently, in step S113, whether the ground feature point is detected from all of the front, rear, left, and right images may be determined.

When the ground feature point is detected from all of the front, rear, left, and right images, posture angles (the amount of pitch-direction rotation, the amount of yaw-direction rotation, and the amount of roll-direction rotation) of the front, rear, left, and right cameras may be estimated based on the ground feature point detected from each image. Here, a description of a processing operation performed by the first posture angle estimator 130 and described above with reference to FIGS. 3 and 4 is applied to an operation of estimating the posture angles.

Subsequently, in step S117, front, rear, left, and right top-view images may be generated by rotation-converting the front, rear, left, and right images at the posture angles which have been estimated in step S115.

Subsequently, in step S119, a final top-view image may be generated by synthesizing the front, rear, left, and right top-view images. In detail, the front, rear, left, and right top-view images may be arranged at designated positions in the top-view image coordinate system, and then, the final top-view image obtained by synthesizing the front, rear, left, and right top-view images may be generated by moving the front and rear top-view images or the left and right top-view images in up, down, left, and right directions so that lanes of the front and rear top-view images and lanes of the left and right top-view images are displayed as one continuous lane.

When the ground feature point is not detected from all of the front, rear, left, and right images in step S113, whether there is an image from which the ground feature point is detected may be determined. For example, when the ground feature point is not detected from all of the front, rear, left, and right images, an operation may move to step S111, and an operation of detecting the ground feature point from the front, rear, left, and right images may be again performed.

When the ground feature point is detected from at least one of the front, rear, left, and right images in step S121, description subsequent to step S121 will be made with reference to FIG. 11.

Referring to FIG. 11, a first posture angle (i.e., the amount of pitch/yaw/roll-direction rotation (or a rotation angle)) of a camera (for example, a left camera or/and a right camera) providing the at least one image may be estimated based on the ground feature point detected from the at least one image (for example, the left image or/and the right image) from which the ground feature point is detected. Here, a description of a processing operation performed by the first posture angle estimator 130 and described above with reference to FIGS. 3 and 4 is applied to an operation of estimating the first posture angle.

Subsequently, in step S125, a first top-view image (for example, a left top-view image or/and a right top-view image) may be generated by rotation-converting the at least one image, based on the estimated first posture angle.

Subsequently, in step S127, by using the lane detection algorithm, a first lane (for example, a left lane defected from the left top-view image or a right lane detected from a right top-view image) may be detected from the first top-view image.

Subsequently, in step S129, by using the lane detection algorithm, a second lane (for example, left and right lanes defected from the front image or/and left and right lanes defected from the rear image) may be detected from the other images (for example, the front image or/and the rear image) from which the ground feature point is not detected.

Subsequently, in step S131, a second posture angle of a camera providing the other images (for example, the front image or/and the rear image) from which the second lane is detected may be estimated based on a correspondence relationship between a feature pattern (a lane direction and a lane thickness) of the detected first lane and a feature pattern (a lane direction and a lane thickness) of the detected second lane. For example, a second posture angle (the amount of pitch/yaw/roll-direction rotation) of each of the front and rear images may be estimated so that a lane direction and a lane thickness of a lane detected from each of the front and rear images from which the ground feature point is not detected match a lane direction and a lane thickness of a lane detected from each of the left and right top-view images generated through rotation-conversion from the left and right images from which the ground feature point is detected.

Subsequently, in step S133, a second top-view image (for example, a front top-view image or/and a rear top-view image) may be generated by rotation-converting the other images (for example, the front image or/and the rear image), based on the estimated second posture angle.

Subsequently, in step S135, a final top-view image may be generated by synthesizing the first top-view image (for example, a left top-view image or/and a right top-view image) which is generated in step S125 and the second top-view image (for example, the front top-view image or/and the rear top-view image). For example, the left and right top-view images and the front and rear top-view images may be arranged at designated positions in the top-view image coordinate system, and then, the final top-view image may be generated by moving the left and right top-view images or the front and rear top-view images in up, down, left, and right directions so that lanes of the left and right top-view images and lanes of the front and rear top-view images are displayed as one continuous lane.

As described above, in the top-view image generating apparatus and method according to the embodiments of the present invention, since a posture angle of a camera is estimated based on a lane even when it is impossible to estimate the posture angle of the camera by using a ground feature point, when an angle at which the camera is installed is changed after a vehicle is released from a factory or a position of the camera is changed by A/S, a camera tolerance may be automatically corrected while the vehicle is driving, thereby solving inconvenience where a driver directly visits an A/S shop for correcting the camera tolerance and improving registration of a top-view image.

The block diagrams of FIGS. 3, 4, and 8 illustrating the top-view image generating apparatus 100 according to an embodiment of the present invention is to be understood to represent a conceptual point of view that embody the principles of the present invention.

Similarly, it should be understood that the flowcharts of FIGS. 10 and 11 are substantially representable in a computer-readable medium and represents various processes performed by a computer or a processor irrespective of whether the computer or the processor is clearly shown or not.

The blocks of FIGS. 3, 4, and 8 illustrated as a processor or a similar concept may be provided by the use of software as well as dedicated hardware.

When the blocks of FIGS. 3, 4, and 8 are implemented by a processor, functions of the blocks illustrated in FIGS. 3, 4, and 8 may be provided by a single dedicated processor, a single shared processor, or a plurality of individual processors, and some of the blocks may be shared.

In addition, the use of control processor, or similar terms that are presented as a concept is not to be construed quoted exclusive of hardware, with the ability to run the software, and it should be understood as implicitly including a read-only memory (ROM), a random access memory (RAM), and a nonvolatile memory for storing a digital signal processor (DSP), hardware, and software, without limitation. Also, other well-known hardware may be included.

As described above, according to the embodiments of the present invention, in order to automatically correct a camera tolerance when a vehicle is driving, a camera posture angle may be estimated in real time, and a top-view image may be generated based on the estimated camera posture angle in real time, thereby improving a registration of the top-view image and consistently maintaining the improved registration even when the vehicle is driving.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A top-view image generating method comprising:
    detecting a ground feature point from at least one of front, rear, left, and right images respectively provided from a plurality of cameras installed in a vehicle;
    estimating a first posture angle of a camera providing the at least one image, based on the detected ground feature point;
    generating a first top-view image by rotation-converting the at least one image, based on the estimated first posture angle;
    detecting a first lane from the first top-view image;
    detecting a second lane succeeding the first lane from another image, from which the ground feature point is not detected, of the front, rear, left, and right images;
    estimating a second posture angle of a camera providing the other image from which the second lane is detected, based on a correspondence relationship between a feature pattern of the detected first lane and a feature pattern of the detected second lane;
    generating a second top-view image by rotation-converting the other image, based on the estimated second posture angle; and
    synthesizing the first top-view image and the second top-view image to generate a final top-view image.

2. The top-view image generating method of claim 1, further comprising:
    before the detecting of the ground feature point,
    obtaining the at least one image from a camera, installed in the vehicle for an optical axis to have a first angle with respect to a ground, among the plurality of cameras; and
    obtaining the other image from a camera, installed in the vehicle for the optical axis to have a second angle less than the first angle with respect to the ground, among the plurality of cameras.

3. The top-view image generating method of claim 1, wherein the estimating of the first posture angle comprises:
    calculating an amount of pitch-direction rotation and an amount of yaw-direction rotation so that a geometric relationship between a previous ground feature point detected from the at least one image obtained from the plurality of cameras at a previous time and a current ground feature point detected from the at least one image obtained from the plurality of cameras at a current time satisfies a predetermined geometric condition;
    generating a middle top-view image by rotation-converting the at least one image by the calculated amount of pitch-direction rotation and the calculated amount of yaw-direction rotation;
    calculating a movement vector of the ground feature point by using a previous ground feature point detected from a middle top-view image generated at a previous time and a current ground feature point detected from a middle top-view image generated at a current time, and calculating a prediction movement vector of the ground feature point based on a movement of the vehicle;
    calculating an amount of roll-direction rotation allowing a direction of the movement vector to match a direction of the prediction movement vector; and
    estimating the first posture angle including the amount of pitch-direction rotation, the amount of yaw-direction rotation, and the amount of roll-direction rotation.

4. The top-view image generating method of claim 1, wherein the estimating of the second posture angle comprises estimating a second posture angle of a camera providing the other image, for a feature pattern of the detected second lane to match a feature pattern of the first lane shown in the first top-view image.

5. The top-view image generating method of claim 4, wherein the feature pattern comprises a lane direction and a lane thickness.

6. The top-view image generating method of claim 5, wherein the estimating of the second posture angle comprises:
    calculating an amount of pitch-direction rotation and an amount of yaw-direction rotation allowing a lane direction and a lane thickness of the second lane detected from the other image to match a lane direction and a lane thickness of the first lane detected from the first top-view image;
    generating a middle top-view image by rotation-converting the other image by the calculated amount of pitch-direction rotation and the calculated amount of yaw-direction rotation;
    calculating a movement vector of a lane feature point by using a previous lane feature point detected from a middle top-view image generated at a previous time and a current lane feature point detected from a middle top-view image generated at a current time, and calculating a prediction movement vector of the lane feature point based on a movement of the vehicle;

calculating an amount of roll-direction rotation allowing a direction of the movement vector to match a direction of the prediction movement vector; and estimating the second posture angle including the amount of pitch-direction rotation, the amount of yaw-direction rotation, and the amount of roll-direction rotation.

7. The top-view image generating method of claim 1, wherein the generating of the final top-view image comprises:
arranging the first top-view image and the second top-view image at designated positions in a top-view image coordinate system;
generating the final top-view image by moving the first top-view image or the second top-view image in up, down, left, and right directions so that a lane of the first top-view image and a lane of the second top-view image is displayed as one continuous lane.

8. A top-view image generating apparatus comprising:
a ground feature point detector detecting a ground feature point from at least one of front, rear, left, and right images respectively provided from a plurality of cameras installed in a vehicle;
a first posture angle estimator estimating a first posture angle of a camera providing the at least one image, based on the detected ground feature point;
a first rotation converter generating a first top-view image by rotation-converting the at least one image, based on the estimated first posture angle;
a lane detector detecting a first lane from the first top-view image and detecting a second lane succeeding the first lane from another image, from which the ground feature point is not detected, of the front, rear, left, and right images;
a second posture angle estimator estimating a second posture angle of a camera providing the other image from which the second lane is detected, based on a correspondence relationship between a feature pattern of the detected first lane and a feature pattern of the detected second lane;
a second rotation converter generating a second top-view image by rotation-converting the other image, based on the estimated second posture angle; and
an image synthesizer synthesizing the first top-view image and the second top-view image to generate a final top-view image.

9. The top-view image generating apparatus of claim 8, wherein
the at least one image is obtained from a camera, installed in the vehicle for an optical axis to have a first angle with respect to a ground, among the plurality of cameras, and
the other image is obtained from a camera, installed in the vehicle for an optical axis to have a second angle less than the first angle with respect to the ground, among the plurality of cameras.

10. The top-view image generating apparatus of claim 9, wherein
the at least one image is an image where an extraction success rate for the ground feature point is high, based on an installation environment where a camera is installed in the vehicle for an optical axis to have a first angle with respect to a ground, and
the other image is an image where an extraction fail rate for the ground feature point is high, based on an installation environment where a camera is installed in the vehicle for an optical axis to have a second angle less than the first angle with respect to the ground.

11. The top-view image generating apparatus of claim 8, wherein the first posture angle estimator comprises:
a first rotation amount calculator calculating an amount of pitch-direction rotation and an amount of yaw-direction rotation so that a geometric relationship between a previous ground feature point detected from the at least one image obtained from the plurality of cameras at a previous time and a current ground feature point detected from the at least one image obtained from the plurality of cameras at a current time satisfies a predetermined geometric condition;
a rotation converter generating a middle top-view image by rotation-converting the at least one image by the calculated amount of pitch-direction rotation and the calculated amount of yaw-direction rotation;
a vector calculator calculating a movement vector of the ground feature point by using a previous ground feature point detected from a middle top-view image generated at a previous time and a current ground feature point detected from a middle top-view image generated at a current time, and calculating a prediction movement vector of the ground feature point based on a movement of the vehicle;
a second rotation amount calculator calculating an amount of roll-direction rotation allowing a direction of the movement vector to match a direction of the prediction movement vector; and
a conversion matrix generator estimating the first posture angle including the amount of pitch-direction rotation, the amount of yaw-direction rotation, and the amount of roll-direction rotation.

12. The top-view image generating apparatus of claim 8, wherein
the second posture angle estimator estimates a second posture angle of a camera providing the other image, for a feature pattern of the detected second lane to match a feature pattern of the first lane shown in the first top-view image, and
the feature pattern comprises a lane direction and a lane thickness.

13. The top-view image generating apparatus of claim 12, wherein the second posture angle estimator comprises:
a first rotation amount calculator calculating an amount of pitch-direction rotation and an amount of yaw-direction rotation allowing a lane direction and a lane thickness of the second lane detected from the other image to match a lane direction and a lane thickness of the first lane detected from the first top-view image;
a rotation converter generating a middle top-view image by rotation-converting the other image by the calculated amount of pitch-direction rotation and the calculated amount of yaw-direction rotation;
a vector calculator calculating a movement vector of a lane feature point by using a previous lane feature point detected from a middle top-view image generated at a previous time and a current lane feature point detected from a middle top-view image generated at a current time, and calculating a prediction movement vector of the lane feature point based on a movement of the vehicle;
a second rotation amount calculator calculating an amount of roll-direction rotation allowing a direction of the movement vector to match a direction of the prediction movement vector; and
a conversion matrix generator generating a conversion matrix representing the second posture angle, including the amount of pitch-direction rotation, the amount of yaw-direction rotation, and the amount of roll-direction rotation, in a matrix type.

* * * * *